US009108539B2

(12) United States Patent
Park et al.

(10) Patent No.: US 9,108,539 B2

(45) Date of Patent: Aug. 18, 2015

(54) SAFETY APPARATUS OF SEAT FOR VEHICLE WITH HEIGHT ADJUST DEVICE

(75) Inventors: Sang Do Park, Ansan-si (KR); Hak Gyun Kim, Suwon-si (KR); Tae Hoon Lee, Hwaseong-si (KR); Chang Oan Woo, Hwaseong-si (KR); Ki Nam Kim, Suwon-si (KR); Eom Seok Yoo, Hwaseong-si (KR); Yong Hee Shin, Yongin-Si (KR); Tae Kon Park, Ulsan (KR); Yong Sun Oh, Ulsan (KR)

(73) Assignees: HYUNDAI MOTOR COMPANY, Seoul (KR); KIA MOTORS CORP., Seoul (KR); HYUNDAI DYMOS INCORPORATED, Seosan-Si (KR)

( * ) Notice: Subject to any disclaimer, the term of this patent is extended or adjusted under 35 U.S.C. 154(b) by 218 days.

(21) Appl. No.: 13/551,990

(22) Filed: Jul. 18, 2012

(65) Prior Publication Data

US 2013/0147241 A1 Jun. 13, 2013

(30) Foreign Application Priority Data

Dec. 9, 2011 (KR) ........................ 10-2011-0131873

(51) Int. Cl.

*B60N 2/427* (2006.01)
*B60N 2/42* (2006.01)
*B60N 2/16* (2006.01)

(52) U.S. Cl.

CPC ............ *B60N 2/1615* (2013.01); *B60N 2/4221* (2013.01); *B60N 2/4228* (2013.01); *B60N 2/43* (2013.01)

(58) Field of Classification Search

CPC ........ B60N 2/1685; B60N 2/43; B60N 2/161; B60N 2/1615; B60N 2/4221; B60N 2/4228
USPC .............. 297/216.1, 344.12, 344.15; 248/421
See application file for complete search history.

(56) References Cited

U.S. PATENT DOCUMENTS

| | | | | |
|---|---|---|---|---|
| 6,733,075 | B2 * | 5/2004 | Schumann et al. | 297/344.12 |
| 7,036,878 | B2 * | 5/2006 | Masutani | 297/216.1 |
| 7,044,543 | B2 * | 5/2006 | Schumann et al. | 297/216.1 |
| 7,077,471 | B2 * | 7/2006 | Schumann et al. | 297/216.1 |
| 7,654,615 | B2 * | 2/2010 | Ventura et al. | 297/344.15 |

FOREIGN PATENT DOCUMENTS

| | | | |
|---|---|---|---|
| JP | 2010-51502 | A | 3/2010 |
| KR | 10-2004-0001150 | A | 1/2004 |
| KR | 10-2009-0029427 | A | 3/2009 |
| KR | 10-2009-0063583 | A | 6/2009 |
| KR | 10-2011-0054530 | A | 5/2011 |

* cited by examiner

*Primary Examiner* — David R Dunn
*Assistant Examiner* — Tania Abraham
(74) *Attorney, Agent, or Firm* — Morgan, Lewis & Bockius LLP

(57) ABSTRACT

A safety apparatus of a seat for a vehicle with a height adjustment device may include a height link that has one end rotatably connected to a seat rail bracket and the other end fixed to a rear hinge pipe, a restriction link that may be disposed at a side of the height link and has one end pivotally coupled to the seat rail bracket, wherein the restriction link may be elastically biased away from the height link, a first anti-rotation mechanism that may be disposed at the height link and the restriction link to restrict rotation of the height link when a front of the height link rotates upward in a front collision, and a second anti-rotation mechanism that may be disposed at the height link and the restriction link to restrict rotation of the height link when a rear of the height link rotates upward in a rear collision.

4 Claims, 5 Drawing Sheets

SAFETY APPARATUS OF SEAT FOR VEHICLE WITH HEIGHT ADJUST DEVICE

CROSS-REFERENCE TO RELATED APPLICATION

The present application claims priority to Korean Patent Application No. 10-2011-0131873 filed on Dec. 9, 2011, the entire contents of which is incorporated herein for all purposes by this reference.

BACKGROUND

1. Field of the Invention

The present invention relates to a safety apparatus of a seat for a vehicle with a height adjustment device. More particularly, it relates to a safety apparatus of a seat for a vehicle with a height adjustment device that protect a passenger as safely as possible by restricting rotation of a seat cushion frame in a collision.

2. Description of Related Art

In general, a seat of a vehicle includes a seat cushion supporting the passenger's lower body, a seat back supporting the upper body, and a headrest supporting the head and neck, in which the frames of the seat cushion and the seat back are a seat cushion frame and a seat back frame, respectively.

The seat cushion frame, as shown in FIG. 1, is divided into an inner seat cushion frame 1 and an outer seat cushion frame 2, the inner seat cushion frame 1 and the outer seat cushion frame 2 are connected by a front hinge pipe 3 and a rear hinge pipe 4.

A height adjustment device that makes it possible to adjust the height of the seat cushion frame includes a pumping device and a rack bar 6, I which the pumping device 5 and the rack bar 6 are mounted only on the outer seat cushion frame 2.

The inner seat cushion frame 1 and the outer seat cushion frame 2 are connected rotatably with respect to a seat rail bracket 9 by a front link 7 and a rear link 8 such that the eight of the seat cushion frame can be adjusted, and the seat rail bracket 9 is combined with a movable rail 11 of the seat rail and the movable rail 11 can move along a fixed rail 12.

Therefore, when the height of the outer seat cushion frame 2 is adjusted by operating the height adjustment device composed of the pumping device 5 and the rack bar 6, the operational force is transmitted to the inner seat cushion frame 1 through the front hinge pipe 3 and the rear hinge pipe 4, such that the outer seat cushion frame 2 and the inner seat cushion frame 1 adjust together the height.

However, in a seat equipped with the height adjustment device having the configuration of the related art, although the outer seat cushion frame 2 restricts the rotation of the front link 7 and the rear link by the restricting force of the height adjustment device composed of the pumping device 5 and the rack bar 6, but the inner seat cushion frame 1 is not provided with a specific mechanism for restriction the rotation of the front link 7 and the rear link 8, such that in a front collision or a rear collision, the inner seat cushion frame 1 is moved up or down by the rotation of the front link 7 and the rear link 8, and accordingly, the passenger in the seat is unbalanced at the inner and outer sides of the seat and severely injured.

The description provided above as a related art is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a safety apparatus of a seat for a vehicle with a height adjustment device that can prevent unbalance between the inner side and the outer side of a seat and protect a passenger in the set as safely as possible by disposing a specific mechanism that can restrict rotation of an inner seat cushion frame without a height adjustment device in a collision.

In an aspect of the present invention, a safety apparatus of a seat for a vehicle with a height adjustment device may include a height link that may have one end rotatably connected to a seat rail bracket combined with an inner seat cushion frame and the other end fixed to a rear hinge pipe connecting the inner seat cushion frame with an outer seat cushion frame, a restriction link that is disposed at a side of the height link and may have one end pivotally coupled to the seat rail bracket, wherein the restriction link is elastically biased away from the height link, a first anti-rotation mechanism that is disposed at the height link and the restriction link to restrict rotation of the height link when a front of the height link rotates upward in a front collision, and a second anti-rotation mechanism that is disposed at the height link and the restriction link to restrict rotation of the height link when a rear of the height link rotates upward in a rear collision.

The first anti-rotation mechanism may include a link locking gear that is formed on the height link along an outer circumference of an arc shape between the one end and the other end of the height link, a link locking block that integrally protrudes from the other end of the restriction link toward the link locking gear, and a block locking gear that is integrally formed on a surface opposite the link locking gear in the link locking block and restricts an upward rotation of the front of the height link by being engaged with the link locking gear when the front of the height link rotates upward in the front collision.

The second anti-rotation mechanism may include a guide slot formed through the height link between the one end and the other end of the height link and having a guide hole formed at an upper side of the guide slot, and a guide pin integrally protruding from the other end of the restriction link, inserted in the guide slot, and restricts an upward rotation of the rear of the height link by coming in contact with the guide hole when the rear of the height link rotates upward in the rear collision.

The guide slot is formed in an arc shape along a rotational path about a hinge shaft connecting the one end of the height link with the seat rail bracket.

The one end of the restriction link is fixed by a bolt inserted through the seat rail bracket and a nut tightened on the bolt, and the safety apparatus may further include a spring that is wound around the bolt, may have one end supported by the seat rail bracket and the other end supported to the restriction link, and provides the restriction link with an elastic force to keep the link locking gear and the block locking gear spaced apart from each other when the front and rear collision does not occur.

A support groove being in close contact with an outer circumference of the nut is integrally formed on the bottom of the height link.

According to the present invention, rotation of the inner seat cushion frame without a height adjustment apparatus can be restricted by the safety apparatus including the height link and the restriction link in a collision, such that it is possible to prevent unbalance between the inner and outer sides of the seat and correspondingly protect a passenger in the seat as safely as possible in a collision.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
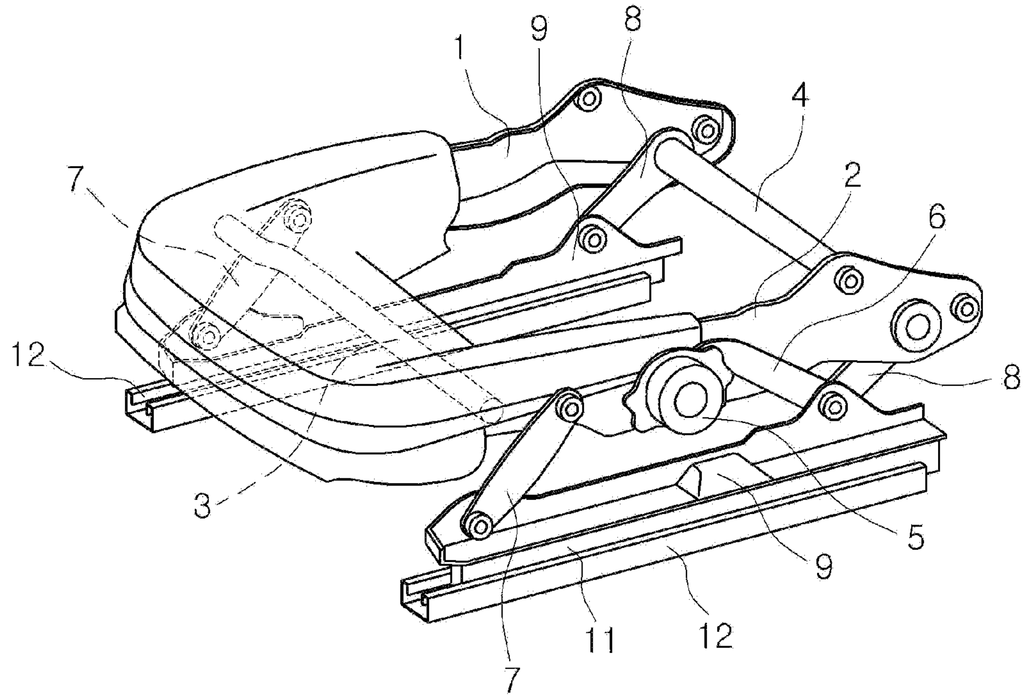
FIG. 1 is a view illustrating a seat for a vehicle which is equipped with a height adjustment device of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

A safety apparatus of a seat of a vehicle with a height adjustment device according to an exemplary embodiment of the present invention is described hereafter with reference to the accompanying drawings, in which the same components as those of the related art are given the same reference numerals.

Figure 2:
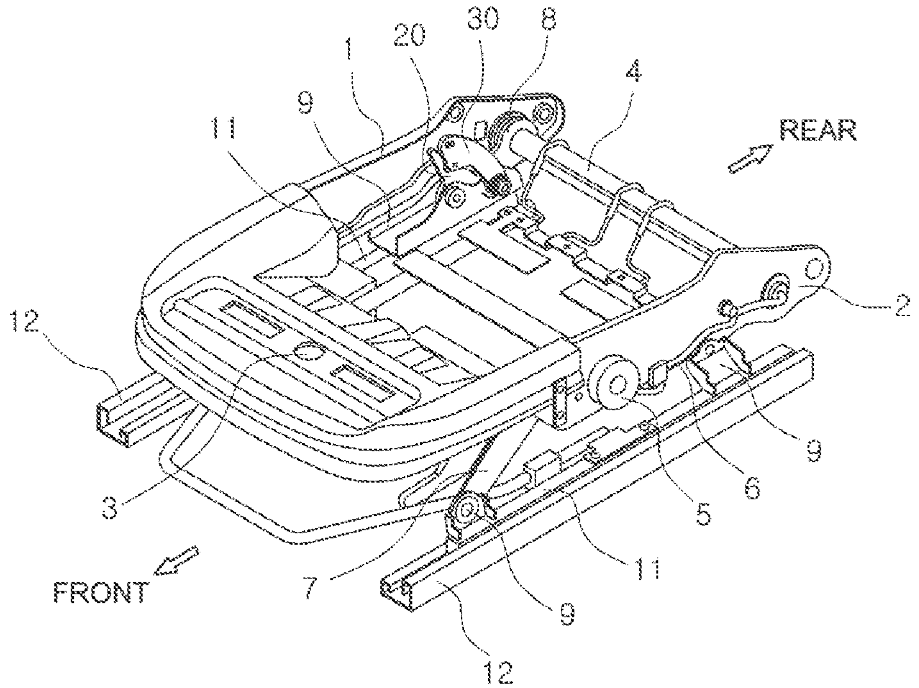
FIG. 2 is a perspective view of a seat cushion frame equipped with a safety apparatus according to an exemplary embodiment of the present invention.
Figure 3:
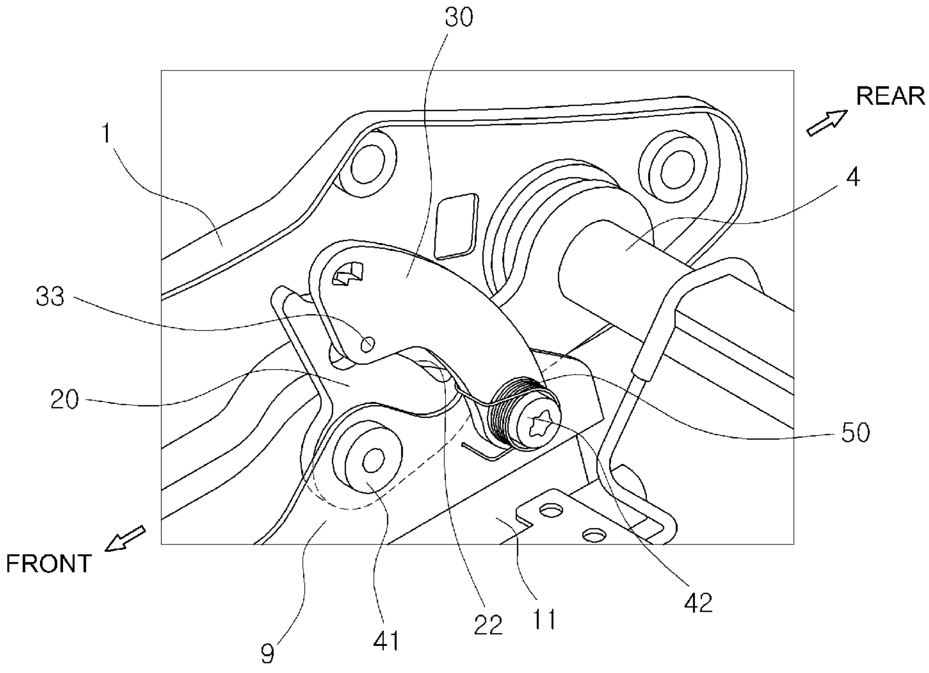
FIGS. 3 and 4 are view of the portion where the safety apparatus according to an exemplary embodiment of the present invention is disposed, seen from the inside and the outside of the seat cushion frame.

A seat cushion frame of the frame of a seat in a vehicle, as shown in FIG. 2, is divided into an inner seat cushion frame 1 and an outer seat cushion frame 2, the inner seat cushion frame 1 and the outer seat cushion frame 2 are connected by a front hinge pipe 3 and a rear hinge pipe 4.

A height adjustment device that makes it possible to adjust the height of the seat cushion frame includes a pumping device and a rack bar 6, in which the pumping device 5 and the rack bar 6 are mounted only on the outer seat cushion frame 2.

The inner seat cushion frame 1 and the outer seat cushion frame 2 are connected rotatably with respect to a seat rail bracket 9 by a front link 7 and a rear link 8 such that the eight of the seat cushion frame can be adjusted, and the seat rail bracket 9 is combined with a movable rail 11 of the seat rail and the movable rail 11 can move along a fixed rail 12.

Therefore, when the height of the outer seat cushion frame 2 is adjusted by operating the height adjustment device composed of the pumping device 5 and the rack bar 6, the operational force is transmitted to the inner seat cushion frame 1 through the front hinge pipe 3 and the rear hinge pipe 4, such that the outer seat cushion frame 2 and the inner seat cushion frame 1 adjust together the height.

A safety apparatus according to an exemplary embodiment of the present invention, which is designed to prevent rotation of a seat in a vehicle which is equipped with the height adjustment device described above in a collision, as shown in FIGS. 2 to 6, includes: a height link 20 that has one end rotatably connected to a seat rail bracket 9 combined with an inner seat cushion frame 1 and the other end integrally connected to the rear hinge pipe 4 connecting the inner seat cushion frame 1 with the outer seat cushion frame 2, a restriction link 30 that is disposed at a side of the height link 20 and has one end fixed to the seat rail bracket 9, a first anti-rotation mechanism that is disposed at the height link 20 and the restriction link 30 to restrict rotation of the height link 20 when the front of the height link rotates upward in a front collision, and a second anti-rotation mechanism that is disposed at the height link 20 and the restriction link 30 to restrict rotation of the height link 20 when the rear of the height link 20 rotates upward in a rear collision.

One end of the height link 20 is rotatably connected to the seat rail bracket 9 by a hinge shaft 41 and the other end disposed through the rear hinge pipe 4 and is integrally connected to the rear hinge pipe 4 by welding.

Further, one end of the restriction link 30 is fixed by a bolt 42 inserted through the seat rail bracket 9 and a nut 43 tightened on the bolt 42.

Meanwhile, the first anti-rotation mechanism includes: a link locking gear 21 that is continuously formed along the outer circumference of an arc shape between one end and the other end of the height link 20, a link locking block 31 that integrally protrudes from the other end of the restriction link

30 toward the link locking gear 21, and a block locking gear 32 that is integrally formed on the surface opposite the link locking gear in the link locking block and restricts the upward rotation of the front of the height link by being engaged with the link locking gear 21 when the front of the height link 20 rotates upward.

Further, the second anti-rotation mechanism includes, a guide slot 22 formed through both sides between one end and the other end of the height link, and a guide pin 33 integrally protruding from the other end of the restriction link 30, inserted in the guide slot 22, and restricts the upward rotation of the rear of the height link 20 by coming in contact with a guide hole 25 formed at upper side of the guide slot 22 when the rear of the height link 20 rotates upward.

The guide slot 22 is formed in an arc shape along the rotational path about the hinge shaft 41 connecting one end of the height link 20 with the seat rail bracket 9.

That is, when the height adjustment device composed of the pumping device 5 and the rack bar 6 operates, the front hinge bracket 3 and the rear hinge pipe 4 moves up/down to move up/down the inner seat cushion frame 1 and the outer seat cushion frame 2, in which as the rear hinge pipe 4 moves up/down, the height link 20 where the other end of the rear hinge pipe 4 is connected rotates about the hinge shaft 41.

Therefore, the guide pin 33 of the restriction link 30 necessarily smoothly moves along the guide slot 22 formed through the height link 20 when the height link 20 rotate about the hinge shaft 41, and for this configuration, the guide slot 22 is necessarily formed in an arc shape along the rotational path about the hinge shaft 41.

Further, the safety apparatus according to an exemplary embodiment of the present invention further includes a spring 50 that is wound around the bolt 42, has one end supported by the seat rail bracket 9 and the other end supported to the restriction link 30, and provides the restriction link 30 with an elastic force to keep the link locking gear 21 and the block locking gear 32 spaced apart from each other when a collision does not occur.

That is, the rear hinge pipe 4 moves up/down such that the inner seat cushion frame 1 and the outer seat cushion frame 2 move up/down and the height link 20 rotates about the hinge shaft 41 when the rear hinge pipe 4 moves, and if the link locking gear 21 and the block locking gear 32 are engaged, the height link 20 cannot rotate about the hinge shaft 41.

Figure 7:
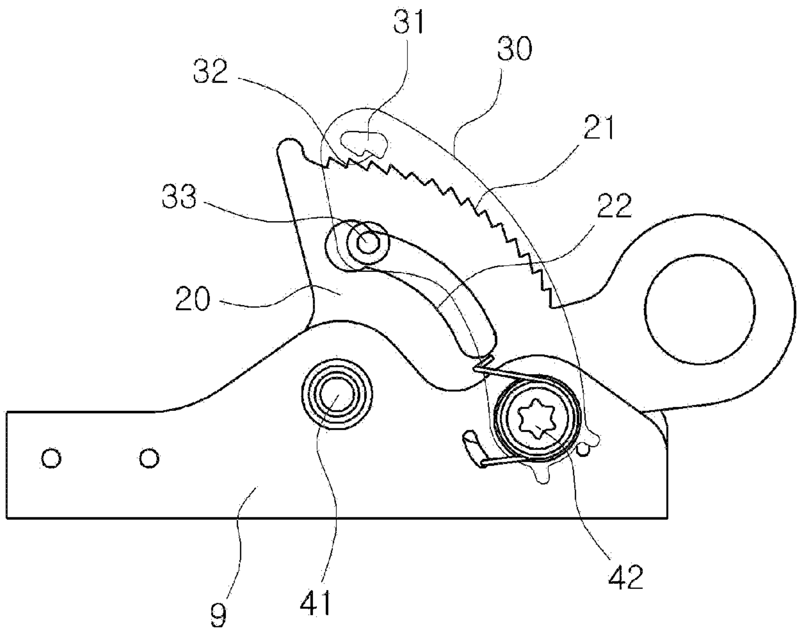
FIGS. 7 and 8 are views illustrating the operational state of the safety apparatus according to an exemplary embodiment of the present invention when the height of the seat cushion frame is adjusted.
Figure 8:
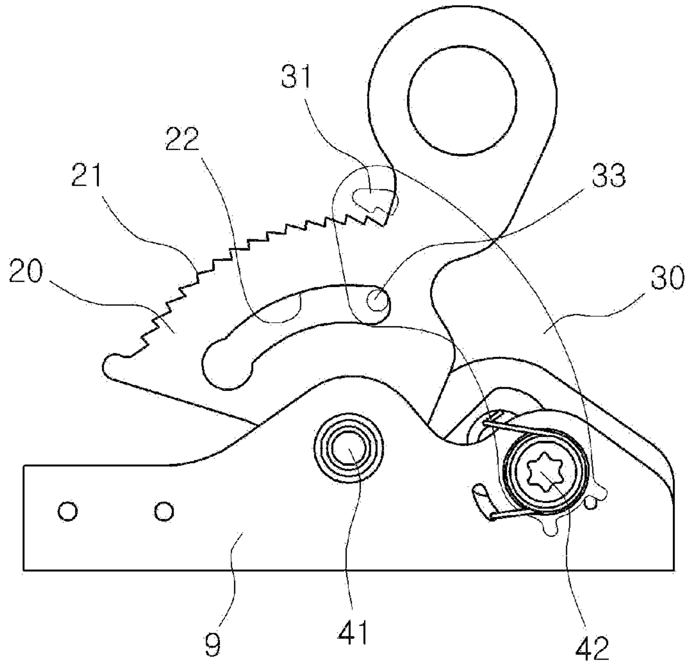

Therefore, in a normal state without a collision, as shown in FIGS. 7 and 8, the link locking gear 21 and the block locking gear 32 is necessarily spaced apart from each other, and for this configuration, the spring 50 necessarily provides the restriction link 30 with an elastic force to keep the link locking gear 21 and the block locking gear 32 spaced apart from each other.

Figure 6:
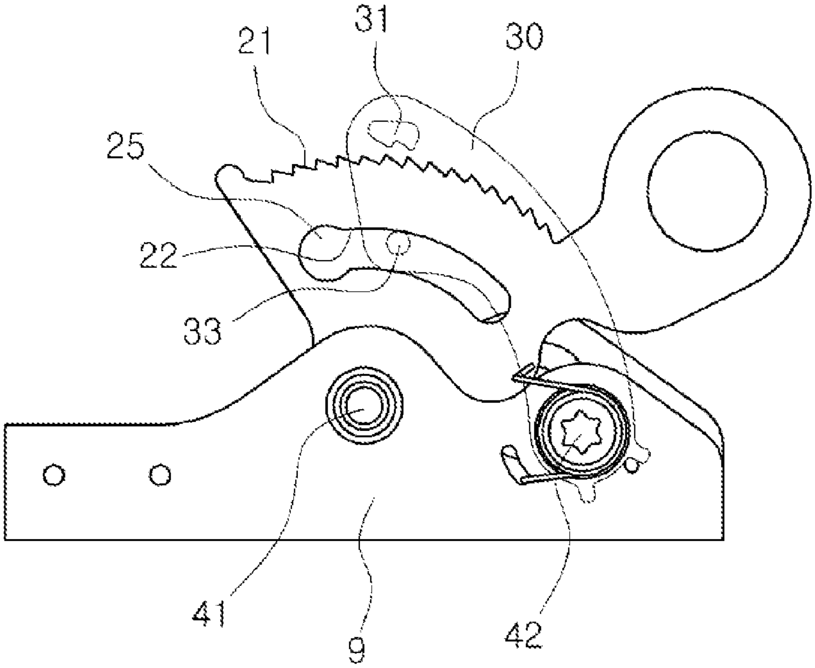

FIG. 7 shows when the inner seat cushion frame 1 and the outer seat cushion frame 2 have moved to the lowermost side, as the height adjustment device composed of the pumping device 5 and the rack bar 6 operates, and FIG. 6 shows when the inner seat cushion frame 1 and the outer seat cushion frame 2 have moved up to the uppermost side.

Meanwhile, a support groove 23 being in close contact with the outer circumference of the nut 43 is integrally formed on the bottom of the height link 20 and precludes the seat from sagging and deforming in a rear collision by supporting the height link 20.

The operation of the safety apparatus according to an exemplary embodiment of the present invention is described hereafter.

In the outer seat cushion frame 2, the rotation of the front link 7 and the rear link 8 is restricted by a restriction force of the height adjustment device composed of the pumping device 5 and the rack bar 6 in a front collision or a rear collision.

Figure 4:
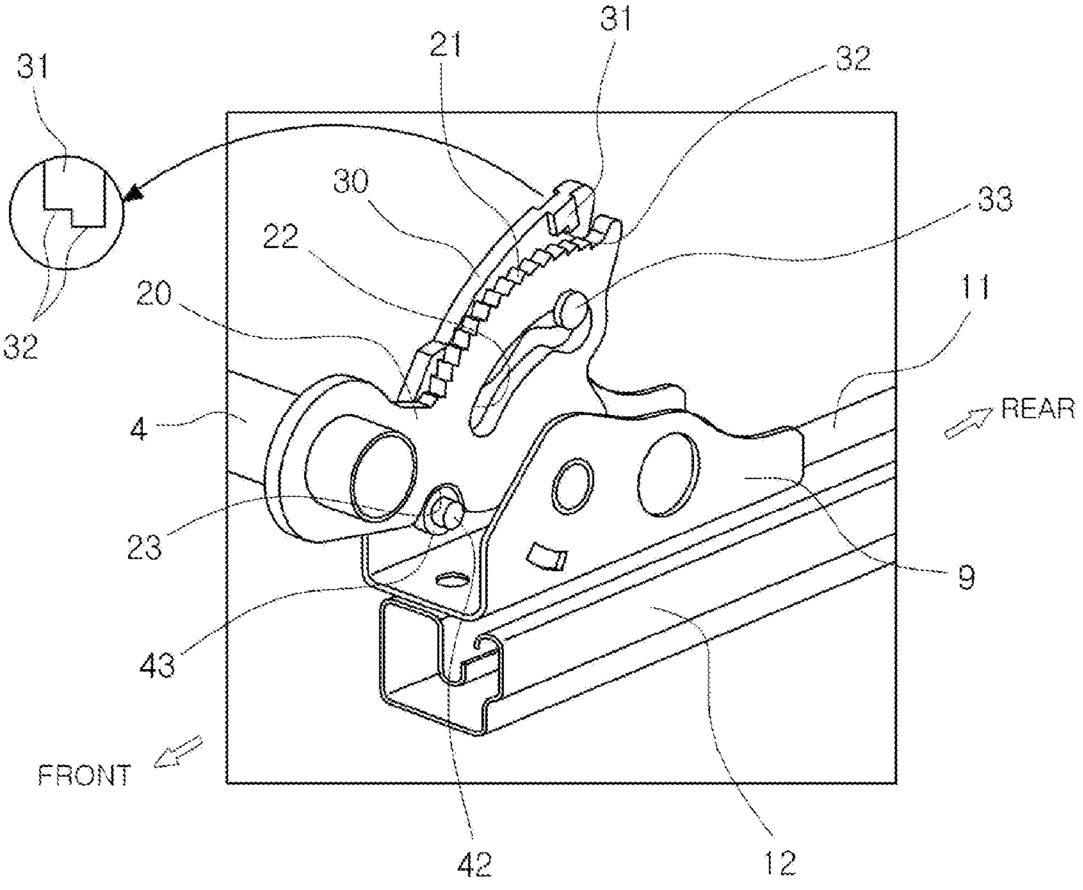

Further, at the inner seat cushion frame 1, the front of the height link 20 rotates upward from the state shown in FIG. 4 in a front collision.

Figure 5:
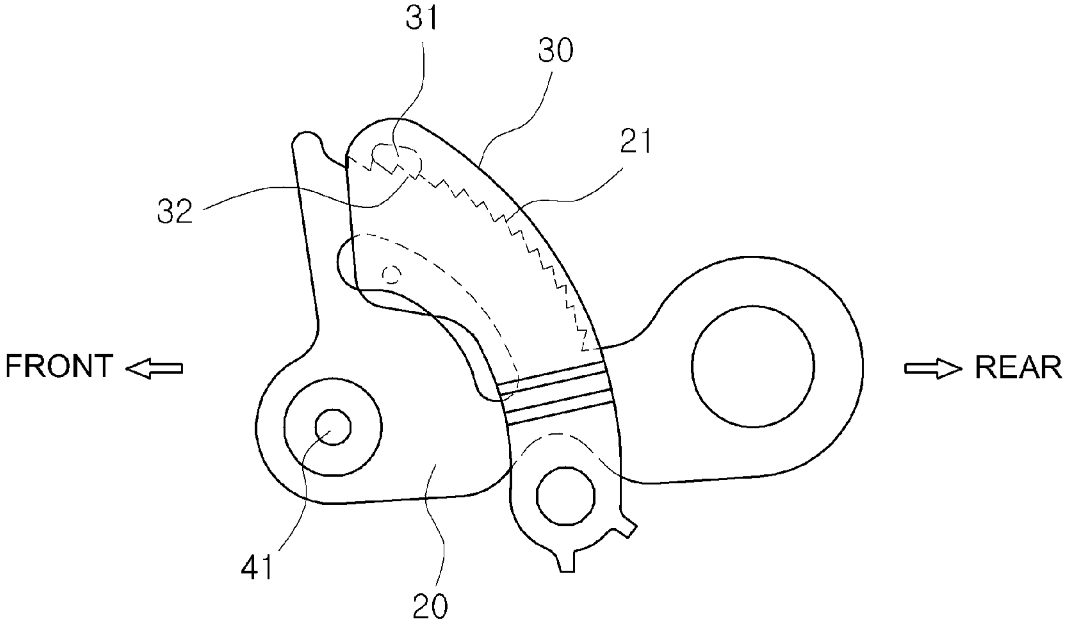
FIGS. 5 and 6 are views illustrating the operational states of the safety apparatus according to an exemplary embodiment of the present invention in a front collision and a rear collision, respectively.

Accordingly, the link locking gear 21 formed at the height link 20, as shown in FIG. 5, is engaged with the block locking gear 32 formed at the restriction link 30, such that the upward rotation of the front of the height link 20 is stopped by the restriction force of the restriction link 30, and as a result, rotation of the inner seat cushion frame 1 also keeps restricted by the height link 20 and the restriction link 30 in a front collision.

Further, at the inner seat cushion frame 1, the rear of the height link 20 rotates upward from the state shown in FIG. 4 in a rear collision.

Accordingly, the guide hole 25 formed at upper side of the guide slot 22 formed at the height link 20, as shown in FIG. 6, comes in contact with the guide pin 33 formed at the restriction link 30, such that the upward rotation of the rear of the height link 20 is stopped by the guide pin 33 of the restriction link 30, and as a result, rotation of the inner seat cushion frame 1 also keeps restricted by the height link 20 and the restriction link 30 in a rear collision.

Therefore, the safety apparatus including the height link 20 and the restriction link 30 according to an exemplary embodiment of the present invention can restrict rotation of the inner seat cushion frame 1 without a height adjustment apparatus in a collision, such that it is possible to prevent unbalance between the inner and outer sides of the seat and correspondingly protect a passenger in the seat as safely as possible in a collision.

Although the present invention was described with reference to a specific embodiment, it is apparent to those skilled in the art that the present invention may be changed and modified in various ways without departing from the scope of the present invention which is provided in the following claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A safety apparatus of a seat for a vehicle with a height adjustment device comprising:

a height link that has one end rotatably connected to a seat rail bracket combined with an inner seat cushion frame and the other end fixed to a rear hinge pipe connecting the inner seat cushion frame with an outer seat cushion frame;

a restriction link that is disposed at a side of the height link and has one end pivotally coupled to the seat rail bracket, wherein the restriction link is elastically biased away from the height link;

a first anti-rotation mechanism that is disposed at the height link and the restriction link to restrict rotation of the height link when a front of the height link rotates upward in a front collision; and a second anti-rotation mechanism that is disposed at the height link and the restriction link to restrict rotation of the height link when a rear of the height link rotates upward in a rear collision, wherein the first anti-rotation mechanism includes:

a link locking gear that is formed on the height link along an outer circumference of an arc shape between the one end and the other end of the height link;

a link locking block that integrally protrudes from the other end of the restriction link toward the link locking gear; and a block locking gear that is integrally formed on a surface opposite the link locking gear in the link locking block and restricts the upward rotation of the front of the height link by being engaged with the link locking gear when the front of the height link rotates upward in the front collision, wherein the one end of the restriction link is fixed by a bolt inserted through the seat rail bracket and a nut tightened on the bolt, and wherein the safety apparatus further comprises a spring that is wound around the bolt, has one end supported by the seat rail bracket and the other end supported to the restriction link, and provides the restriction link with an elastic force to keep the link locking gear and the block locking gear spaced apart from each other when the front and rear collision does not occur.

2. The safety apparatus of claim 1, wherein the second anti-rotation mechanism includes:

a guide slot formed through the height link between the one end and the other end of the height link and having a guide hole formed at an upper side of the guide slot; and a guide pin integrally protruding from the other end of the restriction link, inserted in the guide slot, and restricting an upward rotation of the rear of the height link by coming in contact with the guide hole when the rear of the height link rotates upward in the rear collision.

3. The safety apparatus of claim 2, wherein the guide slot is formed in an arc shape along a rotational path about a hinge shaft connecting the one end of the height link with the seat rail bracket.

4. The safety apparatus of claim 1, wherein a support groove being in close contact with an outer circumference of the nut is integrally formed on a bottom of the height link.

* * * * *